US011457487B2

United States Patent
Lee

(10) Patent No.: US 11,457,487 B2
(45) Date of Patent: Sep. 27, 2022

(54) METHODS AND SYSTEMS FOR CONNECTING TO A WIRELESS NETWORK

(71) Applicant: Comcast Cable Communications, LLC., Philadelphia, PA (US)

(72) Inventor: Yiu Leung Lee, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 15/088,749

(22) Filed: Apr. 1, 2016

(65) Prior Publication Data

US 2017/0290074 A1 Oct. 5, 2017

(51) Int. Cl.
| | |
|---|---|
| *H04W 4/00* | (2018.01) |
| *H04W 76/11* | (2018.01) |
| *H04W 8/18* | (2009.01) |
| *H04W 48/18* | (2009.01) |
| *H04L 101/622* | (2022.01) |
| *H04W 84/12* | (2009.01) |
| *H04W 48/20* | (2009.01) |
| *H04W 88/16* | (2009.01) |

(52) U.S. Cl.
CPC ............. *H04W 76/11* (2018.02); *H04W 8/18* (2013.01); *H04W 48/18* (2013.01); *H04L 2101/622* (2022.05); *H04W 48/20* (2013.01); *H04W 84/12* (2013.01); *H04W 88/16* (2013.01)

(58) Field of Classification Search
CPC ..... H04W 48/18; H04W 48/20; H04W 88/16; H04W 8/18
See application file for complete search history.

(56) References Cited

U.S. PATENT DOCUMENTS

| | | | |
|---|---|---|---|
| 7,551,574 B1 | 6/2009 | Peden, II et al. | |
| RE41,168 E | 3/2010 | Shannon | |
| 7,986,938 B1 | 7/2011 | Meenan et al. | |
| 9,088,386 B2 | 7/2015 | Brisebois et al. | |
| 2003/0046397 A1* | 3/2003 | Trace | H04L 12/2856 709/227 |
| 2003/0074422 A1 | 4/2003 | Montemurro et al. | |
| 2004/0214572 A1 | 10/2004 | Thompson et al. | |

(Continued)

FOREIGN PATENT DOCUMENTS

| | | |
|---|---|---|
| CA | 2962974 | 3/2017 |
| EP | 2894830 A1 | 7/2015 |

(Continued)

OTHER PUBLICATIONS

European Search Report and Written Opinion dated Aug. 9, 2017 by the European Patent Office for EP Application No. 17164152.5, which was filed on Mar. 31, 2017 and published as EP 3226592 A1 on Oct. 4, 2017 (Applicant—Comcast Cable Communications, LLC) (12 pages).

(Continued)

*Primary Examiner* — Bo Hui A Zhu
(74) *Attorney, Agent, or Firm* — Ballard Spahr LLP

(57) ABSTRACT

Systems and methods are described for connecting to a wireless network. In an aspect, when a wireless device is brought to an area in which two wireless networks are accessible, for example a public network and a private network, the device can reject a connection to the public network and connect to the private network based on an association between the device and the user.

21 Claims, 7 Drawing Sheets

(56) References Cited

U.S. PATENT DOCUMENTS

| | | |
|---|---|---|
| 2006/0153122 A1 | 7/2006 | Hinman |
| 2008/0316983 A1 | 12/2008 | Daigle |
| 2009/0293106 A1 | 11/2009 | Gray et al. |
| 2010/0107225 A1 | 4/2010 | Spencer et al. |
| 2011/0086614 A1 | 4/2011 | Brisebois et al. |
| 2012/0204236 A1 | 8/2012 | Chen et al. |
| 2013/0174239 A1 | 7/2013 | Kim et al. |
| 2013/0305320 A1 | 11/2013 | Warrick et al. |
| 2013/0347073 A1 | 12/2013 | Bryksa et al. |
| 2014/0068705 A1 | 3/2014 | Chambers et al. |
| 2014/0126356 A1 | 5/2014 | Lee et al. |
| 2014/0164616 A1 | 6/2014 | Pinto et al. |
| 2014/0171078 A1 | 6/2014 | Ryerson |
| 2014/0235205 A1 | 8/2014 | Paluch et al. |
| 2014/0370852 A1 | 12/2014 | Wohlert et al. |
| 2015/0006695 A1 | 1/2015 | Gupta |
| 2015/0063329 A1 | 3/2015 | Frye et al. |
| 2015/0195362 A1 | 7/2015 | Ong et al. |
| 2015/0327052 A1* | 11/2015 | Ghai .................. H04W 48/02 370/328 |
| 2016/0088026 A1 | 3/2016 | Mohamad Abdul et al. |
| 2016/0373925 A1* | 12/2016 | Li .......................... H04W 12/06 |
| 2017/0290074 A1 | 10/2017 | Lee |
| 2018/0262964 A1* | 9/2018 | Igawa .................. H04W 36/30 |
| 2021/0037019 A1 | 2/2021 | Ong et al. |

FOREIGN PATENT DOCUMENTS

| | | |
|---|---|---|
| EP | 17164152.5 | 3/2017 |
| EP | 3226592 A1 | 10/2017 |
| WO | 2012166671 A1 | 12/2012 |

OTHER PUBLICATIONS

Cisco "802.11 Association Process Explained" (2013) (3 pages).
European Search Report issued in related application No. EP 15150669.8 dated Jun. 5, 2015.
Canadian Office Action issued in related application No. CA 2,877,359 dated Mar. 10, 2021.
European Office Action issued in related application No. EP 17164152.5 dated Aug. 26, 2021.

* cited by examiner

METHODS AND SYSTEMS FOR CONNECTING TO A WIRELESS NETWORK

BACKGROUND

Users connect to a variety of wireless networks over the course of a normal day. To simplify the connection process, users typically allow mobile devices, which may connect to several networks over the course of a day, to store connection information for commonly-accessed networks. Each mobile device, then, is responsible for connecting to a network when the network is in range. When two or more networks for which the mobile device stores connection information are in range, the mobile device selects one of the plurality of available networks.

Since a network is selected without input from the user, the user is often unaware of which wireless network the mobile device has secured access to. This can cause frustration when a policy associated with the network to which the user's mobile device is connected does not comport with the policy expected by the user. A policy associated with a wireless network to which a user is connected can determine a service level the user receives, and one or more services to which the user has access. For example, the user may expect the mobile device to connect to a different network that provides access to one or more services not provided by the network to which the device is actually connected. These and other difficulties are addressed in the following description.

SUMMARY

It is to be understood that both the following general description and the following detailed description are exemplary and explanatory only and are not restrictive. Provided are methods and systems for connecting to a wireless network.

In an aspect, when a device (e.g., a wireless device) is brought to an area in which two networks are accessible, for example a public network (e.g., a community wireless network, a publically available wireless network, and/or other network not administered by a single user) and a private network (e.g., a network administered by a user), the device can automatically reject a connection to the public network and connect to the private network based on an association between the device and the user (e.g., a subscriber, etc.). In some aspects, a network device can provide access to both a private network (e.g., a network administered by an owner or renter of the network device) and a public network (e.g., a community wireless network). For example, the device can refuse a connection with the public network even when the last connection made by the device was to a public network having the same name (e.g., a community Wi-Fi network) in favor of connecting to the available private network.

In another aspect, when the device is brought into an area in which two networks are accessible, for example a public network and a private network, the device can be provided with a use or access policy (e.g., an allowed bandwidth, a quality of service designation, a list of allowed services, and/or the like) that is consistent with a use or access policy associated with the private network, regardless of whether the device is actually connected to the private network or the public network. For example, the device can connect to either the public network or the private network, but can operate using a use or access policy associated with the private network and the device and/or user. In this way, the experience provided to the user can be that of a connection to the private network, regardless of which network the device is actually connected to.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
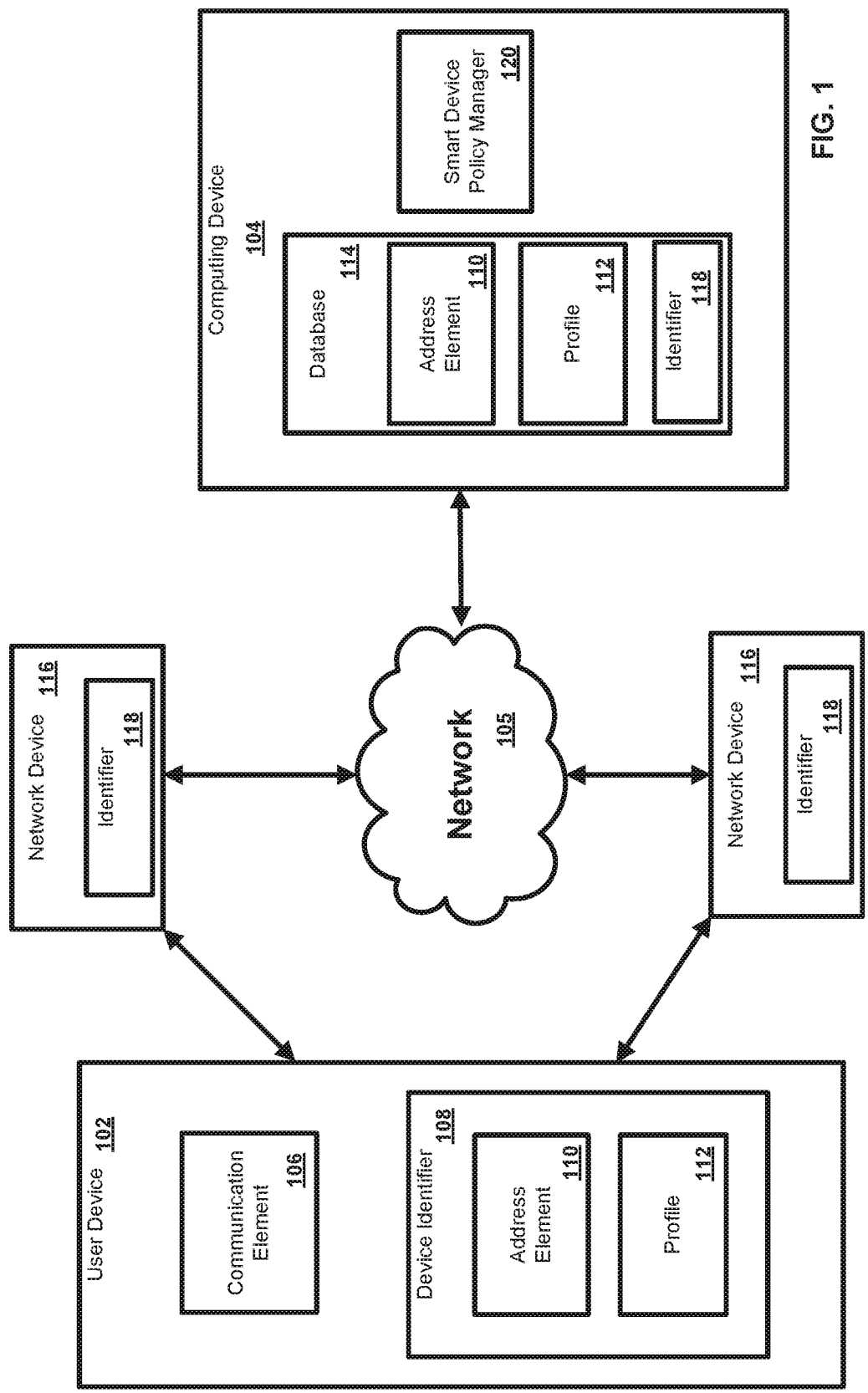
FIG. 1 is a block diagram illustrating various aspects of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

A device (e.g., wireless device) can be configured to connect to one of many networks. The networks can be, for example, a public network and/or a private network. The device can be positioned such that the networks are all available to the device for a connection at the same time/place. To connect to one of the networks, the device can transmit a profile to a gateway device that facilitates connection to the many networks. The gateway device can transmit at least a portion of the profile to a smart device policy manager that can determine an access policy and/or one of the many networks to which the device can connect. The smart device policy manager can communicate an indication of the policy and/or an indication of one of the many networks to the device via the gateway device.

Disclosed are methods and systems that further enable creation/use of a profile of the device to control which network the device connects to. For example, the device can access the profile to identify which of the networks the device should connect to and/or which of the networks the device should disconnect from. A smart device policy manager operated by a network management entity (e.g., a service provider, etc.) can generate, modify, store, transmit, etc. one or more profiles for the device. A profile can comprise information related to ownership of the device, usage of the device, and/or environment in which the device operates. For example, the profile can comprise an identification of a device owner, information related to a cable modem and/or home gateway associated with the device and/or the device owner, and/or the like. In response to the device being connected to a network a first time (e.g., a new device being activated on the network), the profile of the device can be constructed and stored by the smart device policy manager.

The smart device policy manager can generate a profile, for example, in response to the device connecting to a network (e.g., public network) provided by a network management entity (e.g., a service provider, etc.). The network management entity can request login information (e.g., a user ID and password) from the user of the device. The login information can be used by the smart device policy manager to associate the device with a particular user (e.g., subscriber) of the network management entity. The received login information and/or the association can be added to the profile by the smart device policy manager. In another aspect, in response to a device connecting to a network (e.g., private network), the smart device policy manager can associate the device with the administrator of the private network (e.g., owner of the network, manager of a gateway device associated with the network, etc.) by, for example, storing an association between the owner of the private network and the device in the profile.

In an aspect, when the device is brought to an area in which more than one network is accessible, for example a public network and a private network, the device can be receive invitations to join both networks. The device can transmit the profile to a gateway device and receive an instruction from the gateway device based on the profile, which can enable the device to automatically reject (e.g., not accept, initiate, request, etc. . . . ) a connection to the public network and instead connect to the private network based on an association between the device and the user and/or the gateway device stored in the profile. For example, the device can reject a connection with the public network even when the last connection made by the device was to a public network having the same name (e.g., a community Wi-Fi network) in favor of connecting to the available private network.

In another aspect, when the device is brought into an area in which two networks are accessible, for example a public network and a private network, the device can be provided with a pre-existing use policy (e.g., available service, quality of service settings, and the like) configured by the network management entity that is consistent with a use policy associated with the private network, regardless of whether the device is actually connected to the private network or the public network. For example, the device can connect to either the public network or the private network, but can operate according to a use policy associated with the private network and the device and/or user, based on the profile without regard to whether the device is connected to the public network or the private network. In this way, the experience provided to the user can be that of a connection to the private network, regardless of which network the device is actually connected to.

As an example, when a user is out in a public area (e.g., a café) that comprises a community wireless (e.g., IEEE 802.11. Bluetooth, ZigBee, LTE, HSPA, etc.) network, the user can connect to the community wireless network, but receive a policy that corresponds to the policy the user would receive when connected to his home network. This allows the user to maintain a continuity of services, regardless of the actual location from which the user connects to the internet.

As an example, when a user returns home from a destination (e.g., a café) at which the user device was connected to a community wireless network, the user device may default to connecting to the last-known network (e.g., the community wireless network). Many home routers also feature a community wireless network. However, services permitted on the community wireless network can be different from services permitted on a user's home network. Accordingly, the connection to the community wireless network can be refused when the user attempts to connect to the community wireless network from home, and the user can instead connect to the home network.

In one aspect of the disclosure, a system can be configured to provide services such as network-related services to a user device. FIG. 1 illustrates various aspects of an exemplary environment in which the present methods and systems can operate. The present disclosure is relevant to systems and methods for providing services to a device, for example, a user device such as a computer, tablet, mobile device, communications terminal, or the like. In an aspect, one or more network devices can be configured to provide various services to one or more devices, such as devices located at or near a premises. In another aspect, the network devices can be configured to recognize an authoritative device for the premises and/or a particular service or services available at the premises. As an example, an authoritative device can be configured to govern or enable connectivity to one or more networks such as the Internet or other remote resources, provide address and/or configuration services like DHCP, and/or provide naming or service discovery services for a premises, or a combination thereof. For example, the authoritative device (e.g., a device with profile manager functionality) can govern or enable connectivity to a public network (e.g., a community wireless network) accessible to all users of, for example, a particular Internet service provider, and a private network available to a particular user of the internet service provider. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network and system can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet or a local area network. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a device identifier 108. As an example, the device identifier 108 can be any identifier, token, character, string, or the like, for differentiating one user device (e.g., user device 102) from another user or user device. In a further aspect, the device identifier 108 can identify a user device as belonging to a particular class of user devices. As a further example, the device identifier 108 can comprise information relating to the user device such as a manufacturer, a model or type of device, a network management entity associated with the user device 102, a state of the user device 102, a locator, and/or a label or classifier. Other information can be represented by the device identifier 108. For example, the device identifier 108 can further comprise user information, such as a user ID and a password associated with the user ID.

In an aspect, the device identifier 108 can comprise an address element 110 and a profile 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

The device identifier 108 can comprise the profile 112. In some aspects, the profile 112 can comprise identification information (e.g., identification of a device and/or a device owner), information related to the environment is which the device operates (e.g., information related to a cable modem and/or home gateway associated with the device and/or the device owner), an identification of a service provider, information related to a policy description describing the policy associated with the user and/or the user device, and/or the like. In an aspect, the profile 112 can comprise an identification of a service provider associated with the user device 102 and/or with the class of user device 102. The class of the user device 102 can be related to a type of device, capability of device, type of service being provided, and/or a level of service (e.g., business class, service tier, service package, etc.). As an example, the identification of the service provider of the profile 112 can comprise information relating to or provided by a communication service provider (e.g., Internet service provider) that is providing or enabling data flow such as communication services to the user device 102. As a further example, the identification of the service provider of the profile 112 can comprise information relating to a preferred service provider for one or more particular services relating to the user device 102. In some aspects, the policy description of the profile 112 can further comprise a policy description regarding the services provided to the user. The policy description can be information that identifies a policy (e.g., an access or use policy). For example, where the policy comprises an allowed bandwidth, a quality of service designation, a list of allowed services, and/or the like, the policy description can comprise an indication of the allowed bandwidth, a quality of service designation, a listing of the allowed services, and/or other similar information. In an aspect, the address element 110 can be used to identify or retrieve data from the profile 112, or vice versa. As a further example, one or more of the address element 110 and the profile 112 can be stored remotely from the user device 102 and retrieved by one or more devices such as the user device 102 and the computing device 104. Other information can be represented by the profile 112.

In an aspect, the computing device 104 can be a server for communicating with the user device 102. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. For example, the computing device 104 can comprise a subscriber database and/or a smart device policy manager 120. In some examples, the subscriber database can comprise a listing of one or more subscribers and their associated devices. In some examples, the smart device policy manager can comprise a listing of one or more devices and an access policy associated with the one or more devices. Examples of an access policy include, but are not limited to, an allowed bandwidth, a quality of service designation, a list of allowed services, and/or the like. In an aspect, the computing device 104 can allow the user device 102 to interact with remote resources such as data, devices, and files. As an example, the computing device can be configured as (or disposed at) a central location (e.g., a headend, or processing facility), which can receive content (e.g., data, input programming) from multiple sources. The computing device 104 can combine the content from the multiple sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102 such as the address element 110 and/or the profile 112. As an example, the computing device 104 can obtain the device identifier 108 from the user device 102 and retrieve information from the database 114 such as the address element 110 and/or the profile 112. As a further example, the computing device 104 can obtain the address element 110 from the user device 102 and can retrieve the profile 112 from the database 114, or vice versa. As a specific example, the identification information of the profile 112 can comprise a network-based identifier (NID), and the policy description can comprise a description of the services provided to the user. For example, the database 114 can comprise a subscriber database that can generate and/or store the NIDs in association with device identification information (e.g., a device MAC address, a device IP address, and/or the like). Any information can be stored in and retrieved from the database 114. The database 114 can be disposed remotely from the computing device 104 and accessed via direct or indirect connection. The database 114 can be integrated with the computing device 104 or some other device or system.

The smart device policy manager 120 can comprise one or more policies associated with one or more (e.g., each) of the NIDs. In some aspects, the policy can be based on the NID, the location from which the device associated with the NID is accessing the network, and/or the time of day that the device associated with the NID is accessing the network.

In an aspect, one or more network devices 116 can be in communication with a network such as a network 105. As an example, one or more of the network devices 116 can facilitate the connection of a device, such as user device 102, to the network 105. As a further example, one or more of the network devices 116 can be configured as a wireless access point (WAP). As another example, one or more of the network devices 116 can be a gateway device. In an aspect, one or more network devices 116 can be configured to allow one or more wireless devices to connect to a wired and/or wireless network using Wi-Fi, Bluetooth or any desired method or standard. For example, the one or more network devices 116 can broadcast a first network and a second network that are Wi-Fi networks (e.g., networks operating according to the IEEE 802.11 standards).

In an aspect, the one or more network devices 116 can comprise an identifier 118. As an example, one or more identifiers can be or relate to an Internet Protocol (IP) Address IPV4/IPV6 or a media access control address (MAC address) or the like. As a further example, one or more identifiers 118 can be a unique identifier for facilitating communications on the physical network segment. In an aspect, each of the network devices 116 can comprise a distinct identifier 118. As an example, the identifiers 118 can be associated with a physical location of the network devices 116.

In an aspect, the network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or users. As a further example, the network devices 116 can be configured with a second SSID (e.g., associated with a public/community network) to function as a secondary network or redundant network for connected communication devices. As an example, the public wireless network can require a username associated with the subscriber's account and a password to access. The private wireless networks can be protected using security protocols, such as Wired Equivalent Privacy (WEP), Wi-Fi Protected Access (WPA), WPA2, and/or the like.

As an example, the one or more network devices 116 can communicate with the user device 102 and the computing device 104 (e.g., the database 114 and/or the smart device policy manager 120) to determine which of the one or more wireless networks the user device should be connected to and/or what access policy should be applied to the connection. For example, the one or more network devices can receive the profile from the user device 102 and can transmit information from the received profile to the computing device 104 (e.g., the subscriber database and/or the smart device policy manager 120) to determine which of the one or more networks (e.g., the public network or the private network) the user device 102 should connect to and/or to determine an access policy associated with the network connection.

In an example, a network device 116 can broadcast a first network having a first SSID and a second network having a second SSID. The user device 102 can transmit a request to connect to the first network to the network device 116. The user device 102 can further transmit, for example, device identifying information and/or the profile 112 with the request to connect. The network device 116 can transmit at least a portion of the profile 112 to the database 114 to determine if the user device 102 is known on the network. In response to a determination that the user device is not known (e.g., no information found in the database 114), the network device 116 can request a username and password from the user device 102. The network device 116 can receive the username and password from the user device 102, and transmit the user name, password, and profile 112 to the database 114. The database 114 can create an NID associated with the user device 102 and the user, and transmit at least the NID and the profile to the smart device policy manager 120. The smart device policy manager 120 can determine a policy associated with the NID, and can transmit information indicating the determined policy to the database 114 and/or the network device 116. The network device 116 can apply the determined policy to a connection with the user device 102.

In some aspects, the determined policy can comprise refusing the connection to the first network. For example, the determined policy can comprise refusing the connection to the first network and indicating that the user device 102 should connect to a different network broadcast by the network device 116. In other aspects, the determined policy can comprise, for example, an allowed bandwidth, a quality of service designation, a list of allowed services, and/or the like to be applied to the connection the first network with the user device 102.

Figure 2:
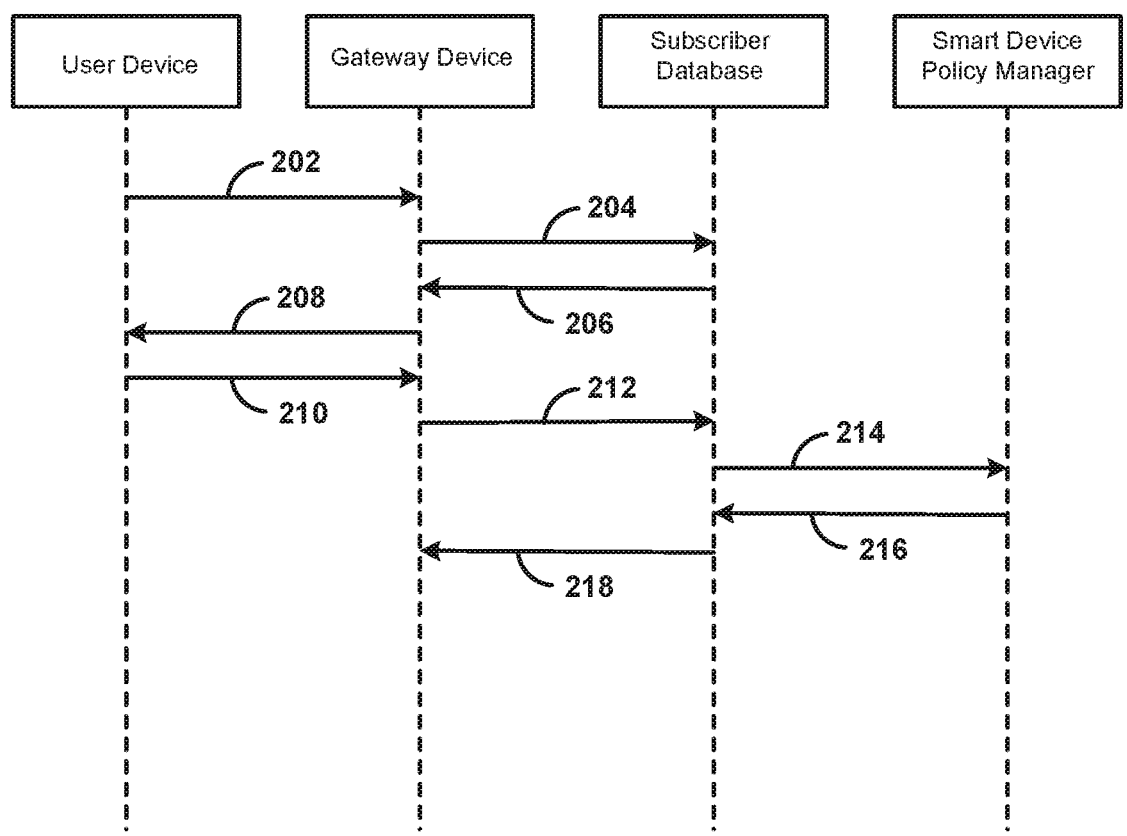
FIG. 2 illustrates a data flow for connecting a device to a wireless network.

FIG. 2 shows a data flow for a user device connecting to a public network. For example, the user device can connect to a public network broadcast by a gateway device according to a wireless standard. As particular examples, the user device can connect according to a Wi-Fi (e.g., IEEE 802.11) standard, a Bluetooth (e.g., IEEE 802.15) standard, an LTE standard, and/or the like. The first time a user device (e.g., the user device 102) is connected to a public network associated with a service provider, the user device can transmit a profile (e.g., identification of a device owner, information related to a cable modem and/or home gateway associated with the device and/or the device owner, and/or the like) to a gateway device (e.g., the network device 116) at 202. In some examples, the user device can also transmit device identifying information (e.g., a device MAC address, a unique device identifier (UDID), and/or the like with the profile. The gateway device can query a subscriber database at 204 to determine if the user device is known. In an aspect, the subscriber database can be a database stored at the gateway device or on a separate device in communication with the gateway device. For example, the subscriber database can be stored on a server (e.g., the computing device 104) associated with the service provider. The subscriber database can respond to the query from the gateway device at 206 by indicating that the user device is unknown.

In response to the indication that the user device is unknown, the gateway device can transmit, to the user device, a request for a username and password associated with the user/user account of the device at 208. In response, the user device can transmit the user name and password to the gateway device at 210. In another aspect, the user device can transmit a unique token (e.g., one or more characters of data) generated for the user device. The gateway device can transmit the username and password and the device identifying information to the subscriber database at 212.

The subscriber database can create an NID associated with the device, and associate the device with the subscriber identified by the username and password. For example, the subscriber database can store the NID with (e.g., as a part of) the profile (e.g., the profile received from the user device). The subscriber database can further transmit at least a portion of the profile (e.g., the NID) to a smart device policy manager at 214, where the smart device policy manager can determine a policy associated with the user device based on the received at least a portion of the profile.

In some examples, the smart device policy manager can transmit information indicating the determined policy to one or more of the subscriber database and the gateway device at 216. For example, the smart device policy manager can determine a policy (e.g., an allowed bandwidth, a quality of service designation, a list of allowed services, and/or the like) to be used for the user device. For example, the smart device policy manager can transmit information indicating the determined policy (e.g., a policy identifier, etc.) to the subscriber database so that future logins from the user device do not require accessing the smart device policy manager.

In some examples, the subscriber database can transmit the information indicating the determined policy to the gateway device at 218 so that the gateway device can provide the user device with the allowed services (e.g., limiting/expanding bandwidth, blocking or providing access to one or more services, etc.).

Figure 3:
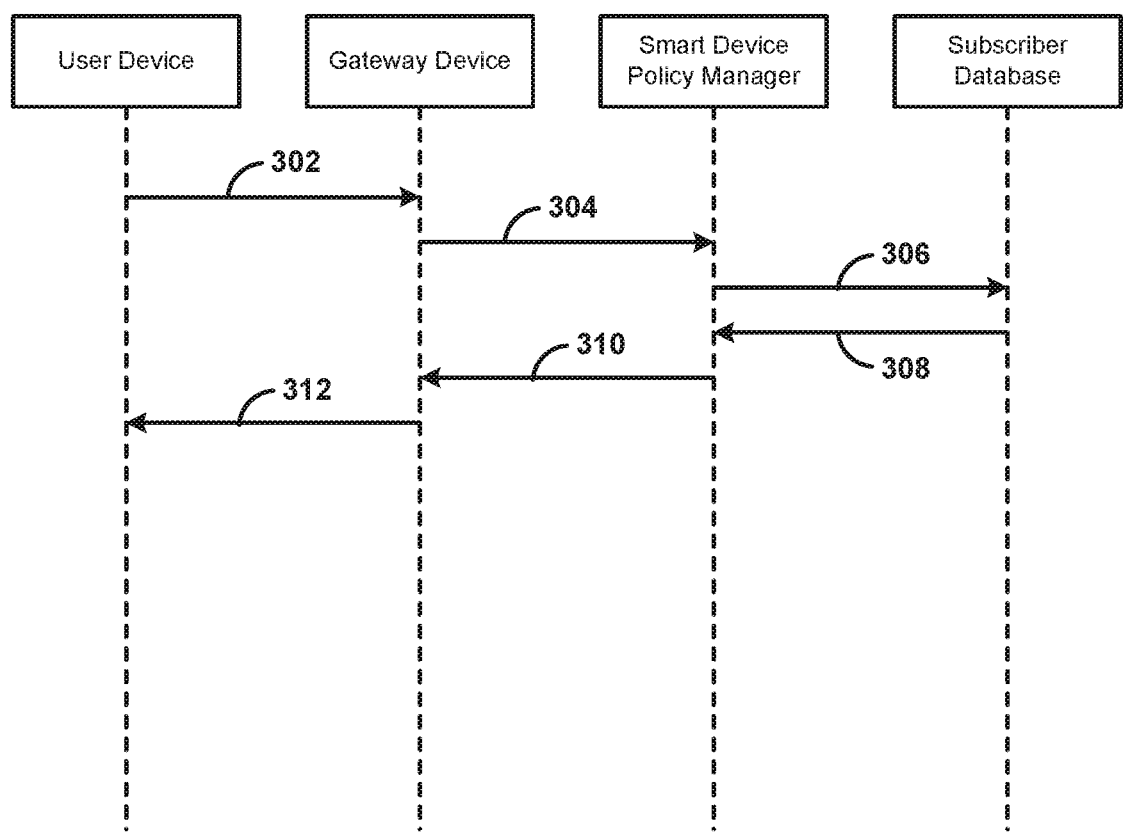
FIG. 3 illustrates another data flow for connecting a device to a wireless network.

FIG. 3 shows a data flow for a user device connecting to a private network. A user device (e.g., the user device 102) can connect to a private network associated with a service provider for the first time and transmit a profile (e.g., identification of a device owner, information related to a cable modem and/or home gateway associated with the device and/or the device owner, and/or the like) to a gateway device (e.g., the network device 116) at 302. For example, the gateway device can broadcast a wireless network according to an IEEE 802.11 standard, an IEEE 802.15 standard, or any other wireless broadcast standard. The gateway device can broadcast at least an SSID, and can receive, from the user device, a request to connect to the network associated with the broadcast SSID. In response to receiving the request from the user device, the gateway device can authenticate the user device through one or more security protocols (e.g., WEP, WPA, WPA2, and the like). After the user device has been authenticated according to the one or more security protocols, the gateway device can allow the user device to connect to the network. In some examples, the profile can comprise device identifying information (e.g., a device MAC address, a unique device identifier (UDID), and/or the like). The gateway device can transmit a notice to a smart device policy manager at 304 to indicate that a device has connected to the private network. In an aspect, the smart device policy manager can be a management application/device within the gateway device. In another aspect, the smart device policy manager can be a separate application/device in communication with the gateway device. The smart device policy manager can determine if the user device is a new device to the private network. For example, the smart device policy manager can receive the device identifying information from the gateway device, and can use the device identifying information to determine if the user device is new to the private network. For example, by searching a database of devices known to the private network. In response to determining that the user device is a new device to the private network, the smart device policy manager can transmit the device identifying information and subscriber information of a subscriber associated with the private network to the subscriber database at 306. In an aspect, the subscriber database can be a database stored at the gateway device or on a separate device in communication with the gateway device. For example, the subscriber database can be stored on a server (e.g., the computing device 104) associated with the service provider.

The subscriber database can create an NID associated with the device and associate the device with the subscriber information of the subscriber associated with the private network. The subscriber database can transmit the NID to the smart device policy manager at 308, where the smart device policy manager can determine a policy associated with the user device. The smart device policy manager can transmit information indicating the determined policy to the gateway device at 310, and the gateway device can provide an IP address to the user device at 312. The gateway device can provide access to user based on the determined policy. For example, the gateway device can implement a policy, providing an allowed bandwidth, a quality of service designation, a list of allowed services, and/or the like.

In some examples, the smart device policy manager can transmit information indicating the determined policy to one or more of the subscriber database and the gateway device. For example, the smart device policy manager can determine a policy (e.g., an allowed bandwidth, a quality of service designation, a list of allowed services, and/or the like) to be used for the user device. In some examples, the smart device policy manager can provide the information indicating the determined policy to the gateway device (e.g., directly, or via the subscriber database) so that the gateway device can provide the user device with the allowed services.

Figure 4:
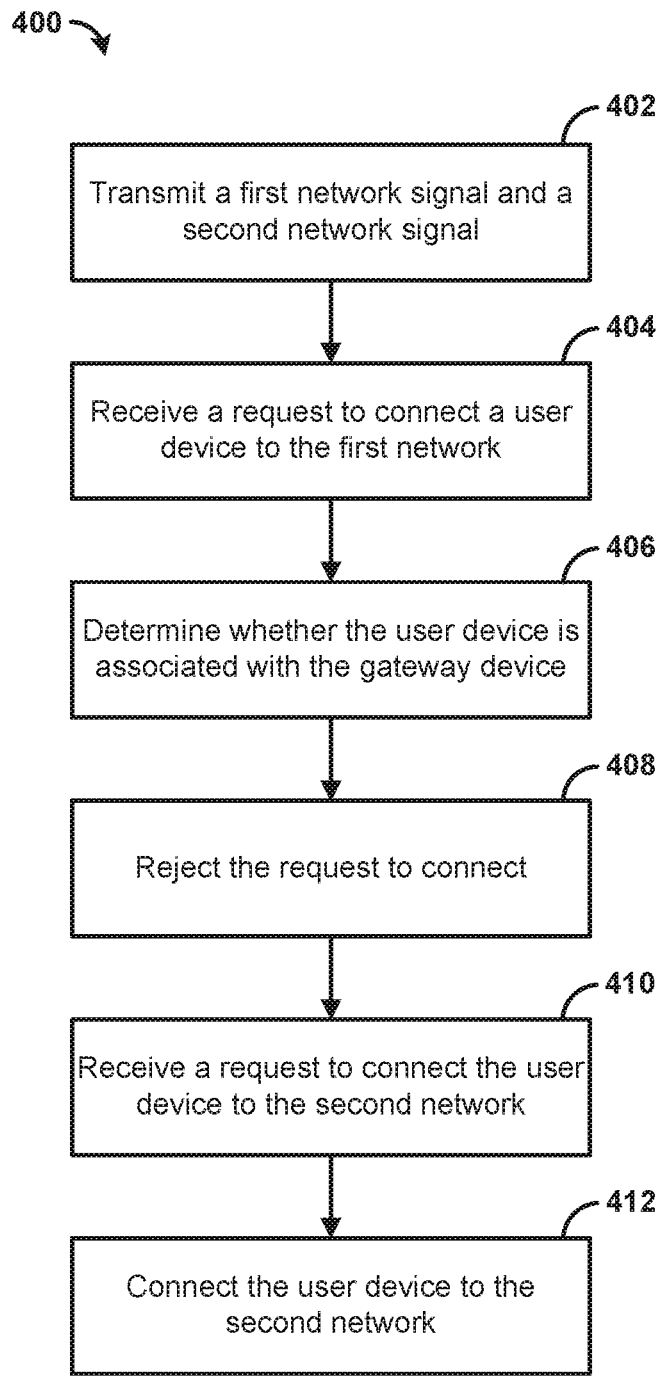
FIG. 4 is a flowchart illustrating an example method.

FIG. 4 is a flowchart illustrating an example method 400. In step 402 a gateway device (e.g., the network device 116) can transmit a first network signal associated with a first SSID for a first network and a second network signal associated with a second SSID for a second network. In an aspect, the first and second networks can comprise wireless networks. For example, the first network and the second network can comprise wireless networks (e.g., networks operating according to the IEEE 802.11 standard, the IEEE 802.15 standard, and/or any other wireless broadcast standards). In an aspect, the first network can comprise a public network, such as a network available to all subscribers of particular service provider and/or non-subscribers. In some aspects, the first wireless network can comprise a community wireless network. The second network can comprise a private network, such as a network maintained and accessed by a specific subscriber. For example, the second network can comprise a network protected using Wired Equivalent Privacy (WEP), Wi-Fi Protected Access (e.g., WPA2), or other similar security protocols.

In step 404, the gateway device can receive, from a user device (e.g., the user device 102), a request to connect the user device to the first network. For example, the user device can be configured such that the user device automatically requests access to a network associated with an SSID that matches a most recent SSID to which the user device was connected. For example, the first wireless network can have a name that matches one or more other public networks broadcast by one or more other users. In some aspects, the request can comprise a profile such as device identification information (e.g., a MAC address associated with the device, a DHCP signature, information identifying the user of the device, and/or the like).

In step 406, the gateway device can determine whether the user device is associated with the gateway device. In some aspects, the gateway device can transmit the device identification information received from the user device to a subscriber database. The subscriber database can comprise a list of devices and corresponding network-based identifiers for the devices. The network-based identifier can comprise information indicating the device and/or the user associated with the device. In some examples, the network-based identifier can further comprise a hash (e.g., an MD5 hash) of the MAC address or Universally Unique Identifier (UUID) associated with the user device. The gateway device can receive, from the subscriber database, the network-based identifier corresponding to the device identification information, and can determine if the network-based identifier is associated with the gateway device. In some aspects, the subscriber database can be stored locally in the gateway device. The locally stored subscriber database can maintain a list of one or more (e.g., all) devices associated with a subscriber that controls the gateway device. In other aspects, the subscriber database can be one or more remote devices in communication the gateway device. The remote subscriber database can, for example, comprise a list of devices and corresponding network-based identifiers for the devices for all subscribers of the service provider.

In step 408, the gateway device can reject the request to connect the user device to the first network based on the user device being associated with the gateway device. In an aspect, rejecting the request to connect the user device to the first network can comprise transmitting the network-based identifier, and identifying information associated with the gateway device (e.g., a media access control (MAC) address and/or an IP address) to a device policy manager. In an aspect, the device policy manager can comprise one or more devices in communication with the gateway device. The device policy manager can retrieve a policy associated with the user device and the gateway device. The device policy manager can transmit the policy to the gateway device, and the gateway device can implement the received policy. For example, the policy can comprise rejecting any attempt to connect to a public network (e.g., the first network) from a home access point (e.g., when the user device connects to the gateway device). In some aspects, rejecting the request to connect the user device to the first network can comprise transmitting, to the user device, an indication that the user device should request to connect to the second network.

In some aspects, the policy associated with the user device can be based on a time of day. For example, the user device can be afforded additional services at particular times of day.

Accordingly, in some aspects, the gateway device can transmit a time of day together with the network-based identifier and the gateway identifying information to the device policy manager. In other aspects, the device policy manager can comprise a timekeeping device that can determine a time of day the network-based identifier and the gateway identifying information are received.

In step 410, the gateway device can receive a request to connect the user device to the second network based on the second SSID from the user device. For example, the user device can be configured to automatically attempt to connect to a different known network when connection to one network is refused. Accordingly, the user device can automatically request to connect to the second SSID when connection to the first SSID is refused in step 408. Alternatively, the user can initiate the request to connect the user device to the second network based on the second SSID. In still another aspect, the user device can request connect to the second network in response to a received indication that the user device should request to connect to the second network.

In step 412, the gateway device can connect the user device to the second network based on the user device being associated with the gateway device. In an aspect, connecting the user device with the second network can comprise transmitting the network-based identifier, and identifying information associated with the gateway device (e.g., a MAC address and/or an IP address) to the device policy manager. In an aspect, the device policy manager can comprise one or more devices in communication with the gateway device. The device policy manager can retrieve a policy associated with the device and access point. The device policy manager can transmit the policy to the gateway device, and the gateway device can implement the received policy. For example, the policy can be to allow connections to the second network received from the device.

Figure 5:
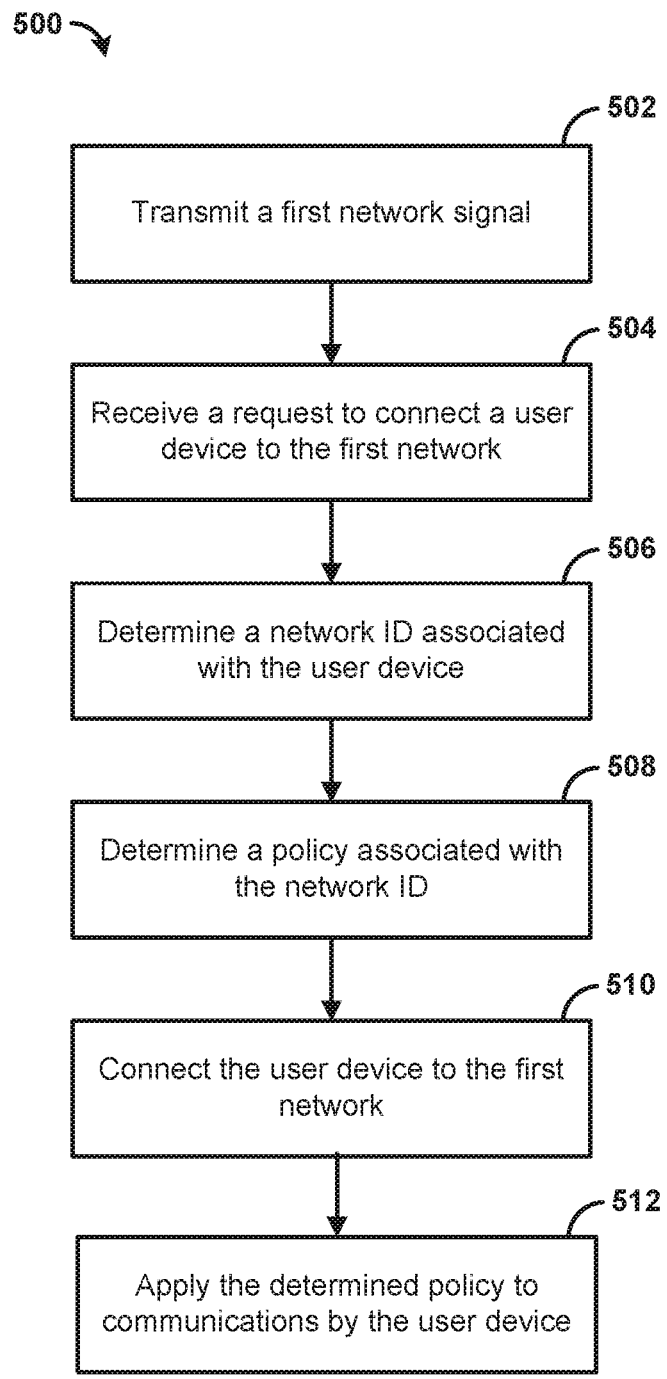
FIG. 5 is a flowchart illustrating an example method.

FIG. 5 shows another exemplary method 500. In step 502, a gateway device (e.g., the network device 116) can transmit a first network signal associated with a first SSID of a first network. In an aspect, the first network can comprise a wireless network. For example, the first network can comprise a wireless network (e.g., a network operating according to the IEEE 802.11 and/or 802.15 standards and/or other wireless broadcasting standards). In an aspect, the first network can be a public network. For example, the first network can comprise a network available to all subscribers of particular service provider and/or non-subscribers. In some aspects, the first wireless network can comprise a community wireless network or public wireless network. In some examples, communications with the first network can be governed by a first policy (e.g., an allowed bandwidth, a quality of service designation, a list of allowed services, and/or the like).

In step 504, the gateway device can receive, from a user device (e.g., the user device 102), a request to connect the user device to the first network. In some aspects, the request to connect to the first network can be based on the first SSID. For example, the user device can be configured such that the user device automatically requests to connect to an SSID that matches a most recent SSID to which the user device was connected. For example, the first wireless network can have a name that matches one or more other public networks broadcast by one or more other users. In some aspects, the request can comprise device identification information (e.g., a MAC address associated with the device, information identifying the user of the device, etc.). In some examples, the gateway device can transmit to the user device, information such as a DHCP signature and the gateway device identity information (e.g., gateway device MAC-address, GPS location and/or an ISP-assigned unique identifier).

In step 506, the gateway device can determine a network-based ID associated with the user device. In some aspects, determining a network-based ID associated with the user device can comprise transmitting the device identification information to a subscriber database. The subscriber database can comprise a plurality of device IDs and their associated network-based IDs. In some aspects, the subscriber database can be stored locally in the gateway device. The locally stored subscriber database can maintain a list of one or more (e.g., all) devices associated with a subscriber that controls the gateway device. In other aspects, the subscriber database can be one or more remote devices in communication with the gateway device. The remote subscriber database can, for example, comprise a list of devices and corresponding network-based identifiers for the devices for all subscribers of the service provider. In some aspects, the network-based ID can comprise a device identifier, a user identifier, and/or a hash (e.g., an MD5 hash) of a MAC address and/or UUID of the user device.

The gateway device can receive, from the subscriber database, the network-based ID associated with the transmitted device identifier. The gateway device can then determine if the network ID is associated with the gateway device In step 508, the gateway device can determine a second policy (e.g., an allowed bandwidth, a quality of service designation, a list of allowed services, and/or the like) associated with the network-based ID. In an aspect, determining the second policy associated with the network-based ID can comprise transmitting the network-based identifier, and identifying information associated with the gateway device (e.g., a MAC address and/or an IP address) to a device policy manager. In an aspect, the device policy manager can comprise one or more devices in communication with the gateway device. The device policy manager can retrieve a policy associated with the user device and the gateway device. The policy manager can transmit an indication of the second policy to the gateway device, and the gateway device can implement the second policy.

For example, each of the first policy and the second policy can comprise, for example, an allowed bandwidth, a quality of service designation, a list of allowed services, and/or the like. In some aspects, the first policy and the second policy can comprise different characteristics. In other aspects, the first policy and the second policy can be directed to the same characteristics.

In some aspects, the second policy associated with the user device can be based on a time of day. For example, the device can be afforded additional services at particular times of day. Accordingly, in some aspects, the gateway device can transmit a time of day together with the network-based identifier and the gateway identifying information to the device policy manager. In other aspects, the device policy manager can comprise a timekeeping device that can determine a time of day the network-based identifier and the gateway identifying information are received.

In step 510, the gateway device can connect the user device to the first network. In an aspect, connecting the user device with the first network can comprise assigning the user device an IP address associated with the first network. In step 512, the gateway device can apply the determined second policy to communications by the user device. For example, the gateway device can provide one or more services and/or data to the user device based on the second policy.

In some aspects, the second policy applied to the user device can comprise denying the request to connect to the first network and assigning an IP associated with the second network signal to the user device, regardless of the network the user device requested access to. In other aspects, the second policy applied to the user device can comprise creating a virtual routing table for the user device to connect to a corporate network. In some aspects, the second policy applied to the user device can comprise assigning one or more different sets of services. For example, the network can allow the user device to access one or more video streaming services, connect to one or more virtual private networks, and/or the like.

Figure 6:
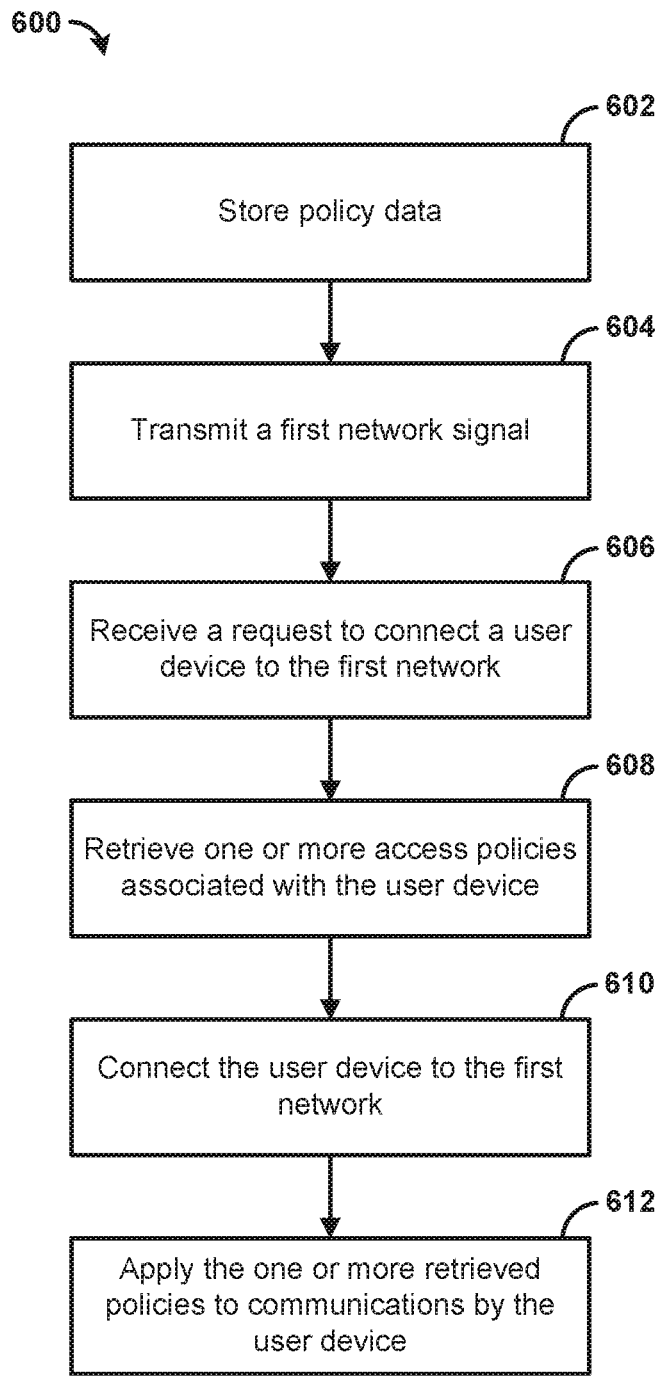
FIG. 6 is a flowchart illustrating an example method.

FIG. 6 shows another exemplary embodiment 600. In step 602, a gateway device (e.g., the network device 116) can store policy data comprising one or more network identifiers and one or more access policies associated with each of the one or more network identifiers.

In step 604, the gateway device can transmit at least a first network signal associated with a first SSID for a first network. In an aspect, the first network can comprise a wireless network. For example, the first network can comprise a wireless network (e.g., a network operating according to the IEEE 802.11 standard, the IEEE 802.15 standard, and/or other wireless broadcasting standards). In an aspect, the first network can be a public network. For example, the first network can comprise a network available to all subscribers of particular service provider and/or non-subscribers. In some aspects, the first wireless network can comprise a community wireless or public wireless network. In some aspects, the gateway device can further transmit a second network associated with a second SSID. The second network can comprise a private wireless network, such as a network maintained and accessed by a specific subscriber. For example, the second network can comprise a network protected using Wired Equivalent Privacy (WEP), Wi-Fi Protected Access (e.g., WPA2), or other similar security protocols.

In step 606, the gateway device can receive, from a user device (e.g., the user device 102), a request to connect the user device to the first network, wherein the request to connect the user device comprises a network identifier. For example, the user device can be configured such that the user device automatically requests access to an SSID that matches a most recent SSID to which the user device was connected. For example, the first wireless network can have a name that matches one or more other public networks broadcast by one or more other users. In some aspects, the request can comprise device identification information (e.g., a MAC address associated with the device, information identifying the user of the device, etc.). In some examples, the gateway device can transmit to the user device, information such as a DHCP signature and the gateway device identity information (e.g., gateway device MAC-address, GPS location, and/or an ISP-assigned unique identifier).

The gateway device can determine whether the policy data comprises the received device identification information. In an aspect, determining whether the policy data comprises the received device identification information comprises determining if one or more policies are associated with the device identification information. In some aspects, the one or more access policies applied to the user device can comprise denying the request to connect to the first network and assigning an IP address associated with the second network signal to the user device, regardless of the network the user device requested access to. In other aspects, the one or more access policies applied to the user device can comprise creating a virtual routing table for the user device to connect to a corporate network.

In step 608, the gateway device can retrieve the one or more access policies associated with the received network identifier (e.g., the network identifier associated with the user device). For example, the device can retrieve the one or more access policies in response to the determination that the policy data includes the received network identifier.

In step 610, the gateway device can connect the user device with the first network. In an aspect, connecting the user device with the first network can comprise assigning the user device an IP address associated with the first network. In step 612, the gateway device can apply the retrieved one or more access policies to communications by the user device. In some aspects, the one or more access policies applied to the user device can comprise assigning one or more different sets of services. For example, the network can allow the user device to access one or more video streaming services, connect to one or more virtual private networks, and/or the like.

Figure 7:
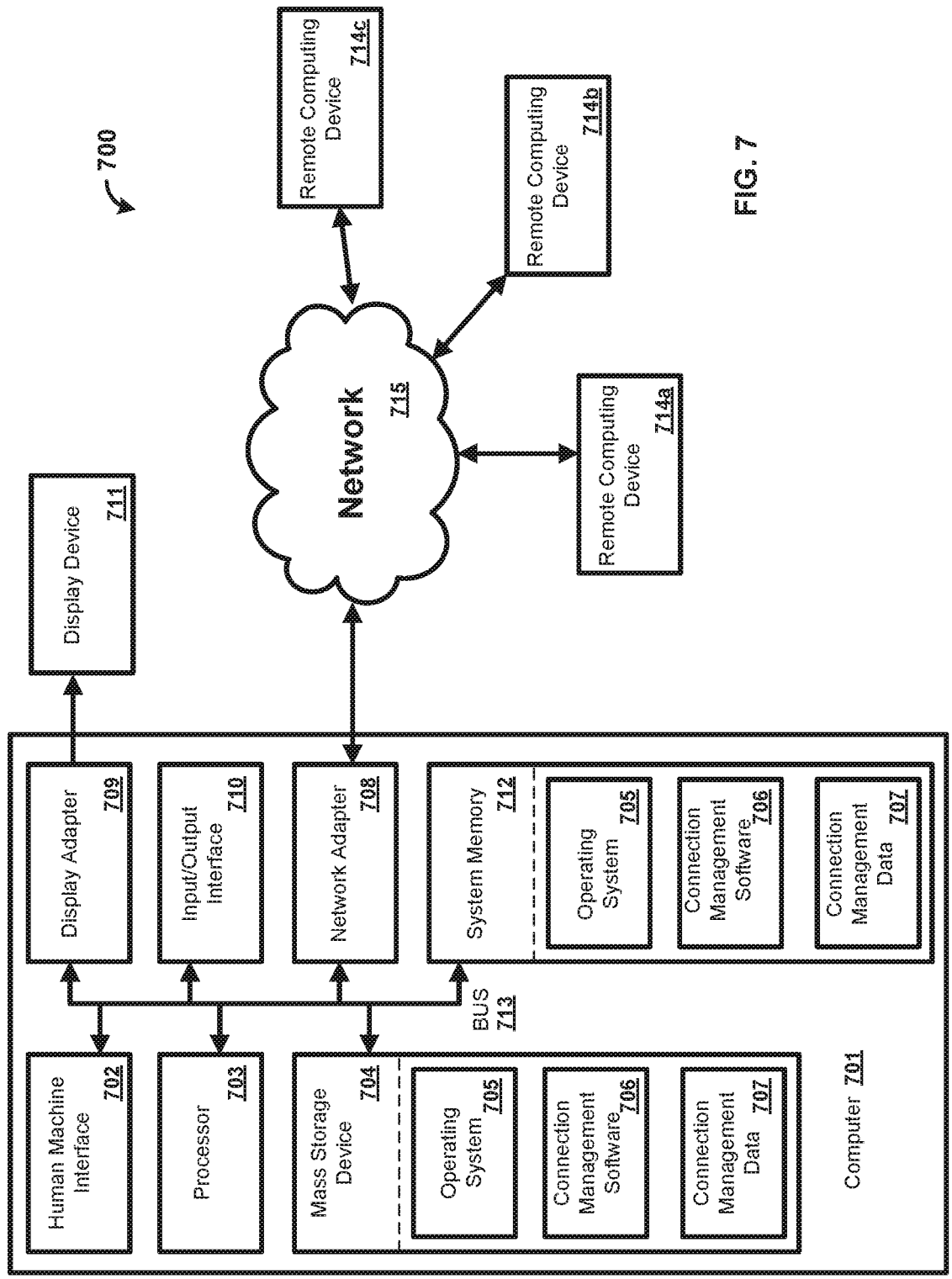
FIG. 7 is a block diagram illustrating an example computing device.

In an exemplary aspect, the methods and systems can be implemented on a computer 701 as illustrated in FIG. 7 and described below. The methods and systems disclosed can utilize one or more computers to perform one or more functions in one or more locations. FIG. 7 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 701. The components of the computer 701 can comprise, but are not limited to, one or more processors 703, a system memory 712, and a system bus 713 that couples various system components including the one or more processors 703 to the system memory 712. The system can utilize parallel computing.

The system bus 713 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCM-CIA), Universal Serial Bus (USB) and the like. The bus 713, and all buses specified in this description can also be implemented over a wired or wireless network connection and each of the subsystems, including the one or more processors 703, a mass storage device 704, an operating system 705, connection management software 706, connection management data 707, a network adapter 708, the system memory 712, an Input/Output Interface 710, a display adapter 709, a display device 711, and a human machine interface 702, can be contained within one or more remote computing devices 714a,b,c at physically separate locations, connected through buses of this form, in effect implementing a fully distributed system.

The computer 701 typically comprises a variety of computer readable media. Exemplary readable media can be any available media that is accessible by the computer 701 and comprises, for example and not meant to be limiting, both volatile and non-volatile media, removable and non-removable media. The system memory 712 comprises computer readable media in the form of volatile memory, such as random access memory (RAM), and/or non-volatile memory, such as read only memory (ROM). The system memory 712 typically contains data such as the connection management data 707 and/or program modules such as the operating system 705 and the connection management software 706 that are immediately accessible to and/or are presently operated on by the one or more processors 703.

In another aspect, the computer 701 can also comprise other removable/non-removable, volatile/non-volatile computer storage media. By way of example, FIG. 7 illustrates the mass storage device 704 which can provide non-volatile storage of computer code, computer readable instructions, data structures, program modules, and other data for the computer 701. For example and not meant to be limiting, the mass storage device 704 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 704, including by way of example, the operating system 705 and the connection management software 706. Each of the operating system 705 and the connection management software 706 (or some combination thereof) can comprise elements of the programming and the connection management software 706. The connection management data 707 can also be stored on the mass storage device 704. The connection management data 707 can be stored in any of one or more databases known in the art. Examples of such databases comprise, DB2®, Microsoft® Access, Microsoft®, SQL Server, Oracle®, mySQL, PostgreSQL, and the like. The databases can be centralized or distributed across multiple systems.

In another aspect, the user can enter commands and information into the computer 701 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 703 via the human machine interface 702 that is coupled to the system bus 713, but can be connected by other interface and bus structures, such as a parallel port, game port, an IEEE 1394 Port (also known as a Firewire port), a serial port, or a universal serial bus (USB).

In yet another aspect, the display device 711 can also be connected to the system bus 713 via an interface, such as the display adapter 709. It is contemplated that the computer 701 can have more than one display adapter 709 and the computer 701 can have more than one display device 711. For example, the display device 711 can be a monitor, an LCD (Liquid Crystal Display), or a projector. In addition to the display device 711, other output peripheral devices can comprise components such as speakers (not shown) and a printer (not shown) which can be connected to the computer 701 via the Input/Output Interface 710. Any step and/or result of the methods can be output in any form to an output device. Such output can be any form of visual representation, including, but not limited to, textual, graphical, animation, audio, tactile, and the like. The display device 711 and computer 701 can be part of one device, or separate devices.

The computer 701 can operate in a networked environment using logical connections to one or more remote computing devices 714a,b,c. By way of example, a remote computing device can be a personal computer, portable computer, smartphone, a server, a router, a network computer, a peer device or other common network node, and so on. Logical connections between the computer 701 and a remote computing device 714a,b,c can be made via a network 715, such as a local area network (LAN) and/or a general wide area network (WAN). Such network connections can be through the network adapter 708. The network adapter 708 can be implemented in both wired and wireless environments. Such networking environments are conventional and commonplace in dwellings, offices, enterprise-wide computer networks, intranets, and the Internet.

For purposes of illustration, application programs and other executable program components such as the operating system 705 are illustrated herein as discrete blocks, although it is recognized that such programs and components reside at various times in different storage components of the computing device 701, and are executed by the one or more processors 703 of the computer. An implementation of the connection management software 706 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
    sending, by a gateway device, a first network signal associated with a first service set identifier (SSID) and a second network signal associated with a second SSID;
    receiving, by the gateway device from a user device, a request to connect the user device to a first network based on the first SSID, wherein the request comprises a device identifier;
    sending, to a computing device, the device identifier;
    receiving, from the computing device, an indication that the device identifier identifies the gateway device;
    rejecting, based on the indication, the request to connect the user device to the first network;
    receiving, from the user device and based on the second SSID, a request to connect the user device to a second network; and
    connecting the user device to the second network.

2. The method of claim 1, wherein the first network comprises a public network, and wherein the second network comprises a private network.

3. The method of claim 1, wherein the computing device comprises a subscriber database.

4. The method of claim 1, further comprising:
    sending, to a subscriber device policy manager, information comprising the indication and a media access control (MAC) address associated with the gateway device; and
    receiving, from the subscriber device policy manager based on the sent information, policy associated with the user device.

5. The method of claim 4, wherein the policy associated with the user device is based on a time of day.

6. The method of claim 1, further comprising determining a user identifier associated with a user of the user device.

7. The method of claim 1, further comprising storing, by a storage device in communication with the gateway device, policy data associated with the user device.

8. A method, comprising:
    sending, by a gateway device, a first network signal associated with a first service set identifier (SSID) of a first network, wherein communications with the first network are governed by a first policy;
    receiving, by the gateway device and from a user device, a request to connect the user device to the first network based on the first SSID;
    determining a first identifier associated with the user device;
    sending, to a policy manager, the first identifier and a second identifier that identifies the gateway device;
    receiving, from the policy manager, an indication of a second policy associated with the user device;
    connecting, based on the indication of the second policy, the user device to the first network; and
    applying the second policy to communications sent, via the first network, that are associated with the user device.

9. The method of claim 8, wherein determining the first identifier associated with the user device comprises:
    sending, to a subscriber database, a device identifier;
    receiving, from the subscriber database, the first identifier, wherein the first identifier is associated with the device identifier; and
    determining if the first identifier is associated with the gateway device.

10. The method of claim 8, wherein the second identifier comprises a MAC address associated with the gateway device, and wherein the policy manager comprises a subscriber device policy manager.

11. The method of claim 8, wherein the indication of the second policy associated with the user device is based on a time of day.

12. The method of claim 8, wherein the first identifier comprises:
    a device identifier associated with the user device, and
    a user identifier associated with a user of the user device.

13. The method of claim 8, further comprising sending, by the gateway device, a second network signal associated with a second SSID of a second network, and wherein the indication of the second policy causes assignment of an internet protocol (IP) address associated with the second network to the user device.

14. The method of claim 13, wherein the first network comprises a public network, and wherein the second network comprises a private network.

15. The method of claim 8, wherein the indication of the second policy causes creation of a virtual routing table for the user device to connect to a third network.

16. A method, comprising:
- sending, by a gateway device, a first network signal associated with a first service set identifier (SSID) and a second network signal associated with a second SSID;
- receiving, by the gateway device from a user device, a request to connect the user device to a first network associated with the first SSID, wherein the request comprises an identifier associated with a subscriber account associated with the user device, and wherein the identifier identifies the gateway device;
- receiving, from a storage device, one or more access policies associated with the identifier;
- denying, based on the one or more access policies being indicative of an association between the user device and the gateway device, the request to connect the user device to the first network;
- connecting the user device to a second network; and
- applying the one or more access policies to communications sent, via the second network, that are associated with the user device.

17. The method of claim 16, wherein the one or more access policies associated with the identifier cause assignment, to the user device, of an internet protocol (IP) address associated with the second network.

18. The method of claim 16, wherein the first network comprises a public network, and wherein the second network comprises a private network.

19. The method of claim 16, wherein the one or more access policies cause denial of the request to connect the user device to the first network based on the identifier being associated with the gateway device.

20. The method of claim 16, wherein the one or more access policies cause creation of a virtual routing table for the user device to connect to a third network.

21. The method of claim 16, further comprising storing, by the storage device, policy data comprising one or more identifiers and the one or more access policies.

* * * * *